US007103220B2

(12) United States Patent  
Ikeda (10) Patent No.: US 7,103,220 B2  
(45) Date of Patent: Sep. 5, 2006

(54) IMAGE PROCESSING APPARATUS, METHOD AND PROGRAM, AND STORAGE MEDIUM

(75) Inventor: Hiroaki Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/153,769

(22) Filed: May 24, 2002

(65) Prior Publication Data

US 2003/0002062 A1    Jan. 2, 2003

(30) Foreign Application Priority Data

Jul. 2, 2001    (JP) .............................. 2001-200732

(51) Int. Cl.  
*G06K 9/34* (2006.01)
(52) U.S. Cl. ..................... 382/173; 382/180
(58) Field of Classification Search ................ 382/173, 382/174, 180, 286  
See application file for complete search history.

(56) References Cited

U.S. PATENT DOCUMENTS 5,228,095 A * 7/1993 Abe ............................ 382/174

5,926,564 A * 7/1999 Kimura ....................... 382/170

FOREIGN PATENT DOCUMENTS

| JP | 7-14000 | 1/1995 |
| JP | 7-282191 | 10/1995 |
| JP | 2000-235619 | 8/2000 |

* cited by examiner

*Primary Examiner*—Phuoc Tran  
(74) *Attorney, Agent, or Firm*—Fitzpatrick, Cella, Harper & Scinto

(57) ABSTRACT

In an image obtained by reading a document or the like, when a round portion is present at a corner of a frame for describing a character, extraction of a region where a character image is described is performed by removing pixels constituting a part of rules or lines constituting the frame. Such pixels are removed from an extracted image region by identifying whether or not a desired pixel group contacting at least one of row-direction rules and column-direction rules constitutes part of the rules, by performing labeling for the pixel group.

20 Claims, 8 Drawing Sheets

| DIRECTORY INFORMATION |
|---|
| FIRST DATA PROCESSING PROGRAM PROGRAM-CODE GROUP CORRESPONDING TO STEPS OF FLOWCHART SHOWN IN FIG.2 |
| SECOND DATA PROCESSING PROGRAM PROGRAM-CODE GROUP CORRESPONDING TO STEPS OF FLOWCHART SHOWN IN FIG.3 |
| THIRD DATA PROCESSING PROGRAM PROGRAM-CODE GROUP CORRESPONDING TO STEPS OF FLOWCHART SHOWN IN FIG.8 |
|   |

IMAGE PROCESSING APPARATUS, METHOD AND PROGRAM, AND STORAGE MEDIUM

BACKGROUND OF THE INVENTION

1. Field of the Invention

The present invention relates to an image processing apparatus, method and program for segmenting a character image described in a frame or a table in a document image, and a storage medium storing such a program.

2. Description of the Related Art

When reading characters described in a document, such as an application form or the like, in many cases, a document formed with a dropout color is used, and characters described with a color different from the dropout color are read and recognized. Since dropout-color documents are printed and distributed using a color adapted to conditions of a light source of a reading apparatus, the documents are expensive and inconvenient.

Although non-dropout-color documents are less expensive and convenient, it is impossible to discriminate between characters and closing lines. Accordingly, the following approaches have been considered as methods for recognizing a non-dropout-color document.

In a conventional method, the positions and the sizes of frames for describing characters within a document are stored in advance as a document definition, and described characters are extracted by reading differences between an input document to be read and the document definition by superposing them after correcting position deviation between the input document and the document definition. In this method, however, since it is necessary to store the document definition in advance, an input document other than the document definition cannot be dealt with. Accordingly, techniques have been considered in which, even if a document definition is not stored in advance, a frame for describing a character and a character within the frame are recognized.

For example, according to Japanese Patent Application Laid-Open (Kokai) No. 07-282191 (1995), a black run continuous for at least a predetermined length in the vertical and horizontal directions is extracted as a set of rules (i.e., lines). In some cases, a vertical rule and a horizontal rule are disconnected. In such a case, the vertical rule and the horizontal rule are virtually extended, and if the length of an extended portion is equal to or less than a threshold, the vertical line and the horizontal line are assumed to be connected, and the black run is recognized as a rectangular frame. However, since the frame is handled to be a straight rectangle, if a document having a round portion at a corner of a frame is recognized, the round corner portion is segmented as a character when extracting a character within the frame and is used in character recognition processing, and erroneous character recognition will sometimes occur.

In Japanese Patent Application Laid-Open (Kokai) No. 07-14000 (1995), a plurality of patterns of corners of a frame are stored in advance. Black pixels continuous in vertical and horizontal directions are checked, and black pixels continuous in the vertical and horizontal directions, having a length equal to or more than a predetermined value are determined to provide rules. A corner-portion pattern that is stored in advance is matched with a intersection point of a pair of a vertical rule and a horizontal rule whose end points are close to each other. If similarity is large, the corner portion is determined to correspond to that pattern. In this approach, it is necessary to store a large number of corner-portion patterns in advance, and therefore to provide a large memory capacity. In addition, a corner portion is not recognized if it has a pattern other than stored patterns.

In Japanese Patent Application Laid-Open (Kokai) No. 2000-235619 (2,000), a round corner portion is determined by identifying a pixel-density distribution in an oblique direction between end points of extracted rules, or by performing a matching operation by generating a pattern connecting end points of rules using an n-degree function. In the former approach, however, when a change in the pixel-density distribution is small, for example, when a thin portion is present in a corner portion, the corner portion is sometimes not recognized. In the latter approach, although a large number of round-corner portions need not be stored in advance, it is necessary to perform processing of generating a pattern using an n-degree function and matching processing, resulting in an increase in the processing time.

As described above, in the above-described conventional approaches, there are problems such that, for example, a large memory capacity is necessary, processing requiring a long time for matching or the like must be performed, accuracy in recognition is inferior, and a round portion of rules is segmented as a character and is erroneously recognized.

SUMMARY OF THE INVENTION

It is an object of the present invention to solve the above-described problems.

It is another object of the present invention to correctly extract a character within a frame for describing a character, even if a corner of the frame is round.

According to one aspect of the present invention, an image processing apparatus includes row-direction-rule extraction means for extracting rules in a row direction from a document image, column-direction-rule extraction means for extracting rules in a column direction from the document image, image-region extraction means for extracting an image region based on a region surrounded by the row-direction rules extracted by the row-direction-rule extraction means and the column-direction rules extracted by the column-direction-rule extraction means, and removal means for removing pixels constituting a part of rules from the image region extracted by the image-region extraction means, by identifying whether or not a desired pixel group contacting at least one of the row-direction rules and the column-direction rules constitutes part of the rules, by performing labeling for the pixel group.

According to another aspect of the present invention, an image processing apparatus includes an image scanner and a processor. The processor is configured to (i) extract rules in a row direction from a document image scanned by said image scanner, (ii) extract rules in a column direction from the document image, (iii) extract an image region based on a region surrounded by the extracted row-direction rules and the extracted column-direction rules, and (iv) remove pixels from the extracted image region that constitute part of rules, by identifying whether a desired pixel group contacting at least one of the row-direction rules and column-direction rules constitutes part of the rules, by performing labeling for the pixel group.

According to still another aspect of the present invention, an image processing method includes a row-direction-rule extraction step of extracting rules in a row direction from a document image, a column-direction-rule extraction step of extracting rules in a column direction from the document image, an image-region extraction step of extracting an image region based on a region surrounded by the row-direction rules extracted in the row-direction-rule extraction step and the column-direction rules extracted in the column-direction-rule extraction step, and a removal step of removing pixels constituting a part of rules from the image region extracted in the image-region extraction step, by identifying whether or not a desired pixel group contacting at least one of the row-direction rules and the column-direction rules constitutes part of the rules, by performing labeling for the pixel group.

According to yet another aspect of the present invention, an image processing program, capable of being executed by a computer, includes program codes for causing a computer to realize steps, the steps including a row-direction-rule extraction step of extracting rules in a row direction from a document image, a column-direction-rule extraction step of extracting rules in a column direction from the document image, an image-region extraction step of extracting an image region based on a region surrounded by the row-direction rules extracted in the row-direction-rule extraction step and the column-direction rules extracted in the column-direction-rule extraction step, and a removal step of removing pixels constituting a part of rules from the image region extracted in the image-region extraction step, by identifying whether or not a desired pixel group contacting at least one of the row-direction rules and the column-direction rules constitutes part of the rules, by performing labeling for the pixel group.

According to yet a further aspect of the present invention, a storage medium stores an image processing program, capable of being executed by a computer, including program codes for causing a computer to realize steps, the steps including a row-direction-rule extraction step of extracting rules in a row direction from a document image, a column-direction-rule extraction step of extracting rules in a column direction from the document image, an image-region extraction step of extracting an image region based on a region surrounded by the row-direction rules extracted in the row-direction-rule extraction step and the column-direction rules extracted in the column-direction-rule extraction step, and a removal step of removing pixels constituting a part of the rules from the image region extracted in the image-region extraction step, by identifying whether or not a desired pixel group contacting at least one of the row-direction rules and the column-direction rules constitutes part of the rules, by performing labeling for the pixel group.

Other features and advantages of the patent invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS (First Embodiment)

Figure 1:
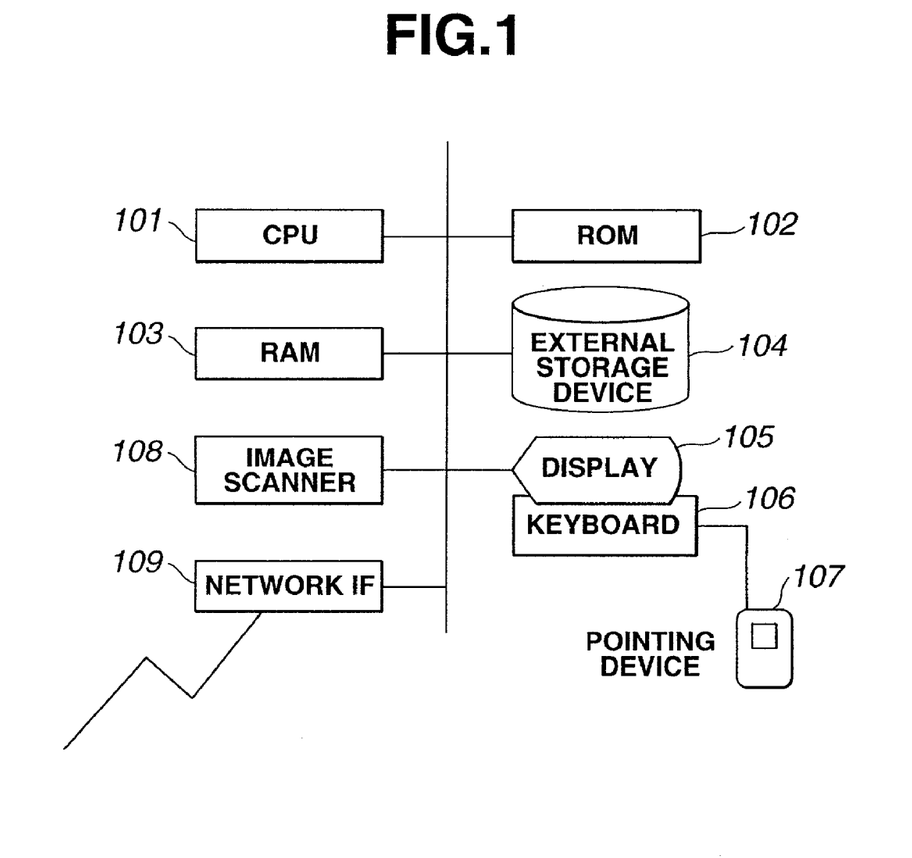
FIG. 1 is a block diagram illustrating an image processing apparatus according to a first embodiment of the present invention.

FIG. 1 is a block diagram illustrating the configuration of an image processing apparatus for reading characters from a document image, according to a first embodiment of the present invention. In FIG. 1, a CPU (central processing unit) 101 controls the entirety of the apparatus in accordance with a control program stored in a ROM (read-only memory) 102. The ROM 102 stores control programs and the like, which control processes shown in flowcharts to be described later, to be executed by the CPU 101. A RAM (random access memory) 103 stores document images and the like, and operates as a working area for the CPU 101. An external storage device 104 comprises a magnetic disk or the like. There are also shown a display 105, a keyboard 106, a pointing device 107, such as a mouse or the like, and an image scanner 108 for reading an image. A network interface 109 communicates with an apparatus present at a remote location (not shown), and reads and writes programs, data and the like. In order to realize the first embodiment, the CPU 101 may execute a control program by reading it from the ROM 102, from the external storage device 104, or an external apparatus connected via a network.

Operation of the first embodiment, as executed by the image processing apparatus shown in FIG. 1, will now be described in detail with reference to FIGS. 1–7.

Figure 4:
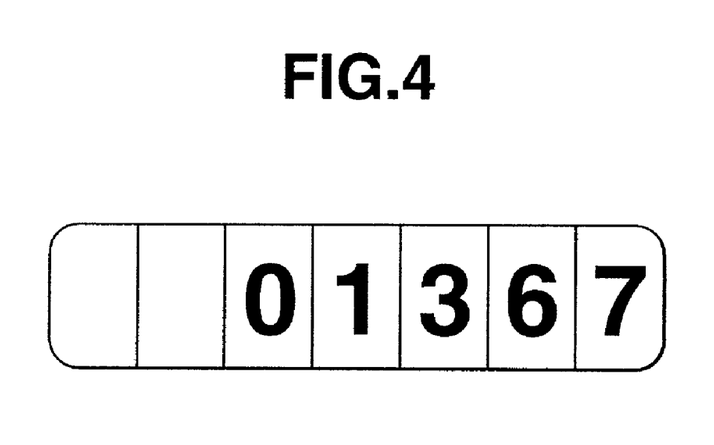
FIG. 4 is a diagram illustrating a frame for describing characters, according to the first embodiment.

The first embodiment deals with a document in which a frame for describing a character is set for each character as shown in FIG. 4. In order to simplify description, the first embodiment deals with a document image obtained by binary coding a read image.

Figure 2:
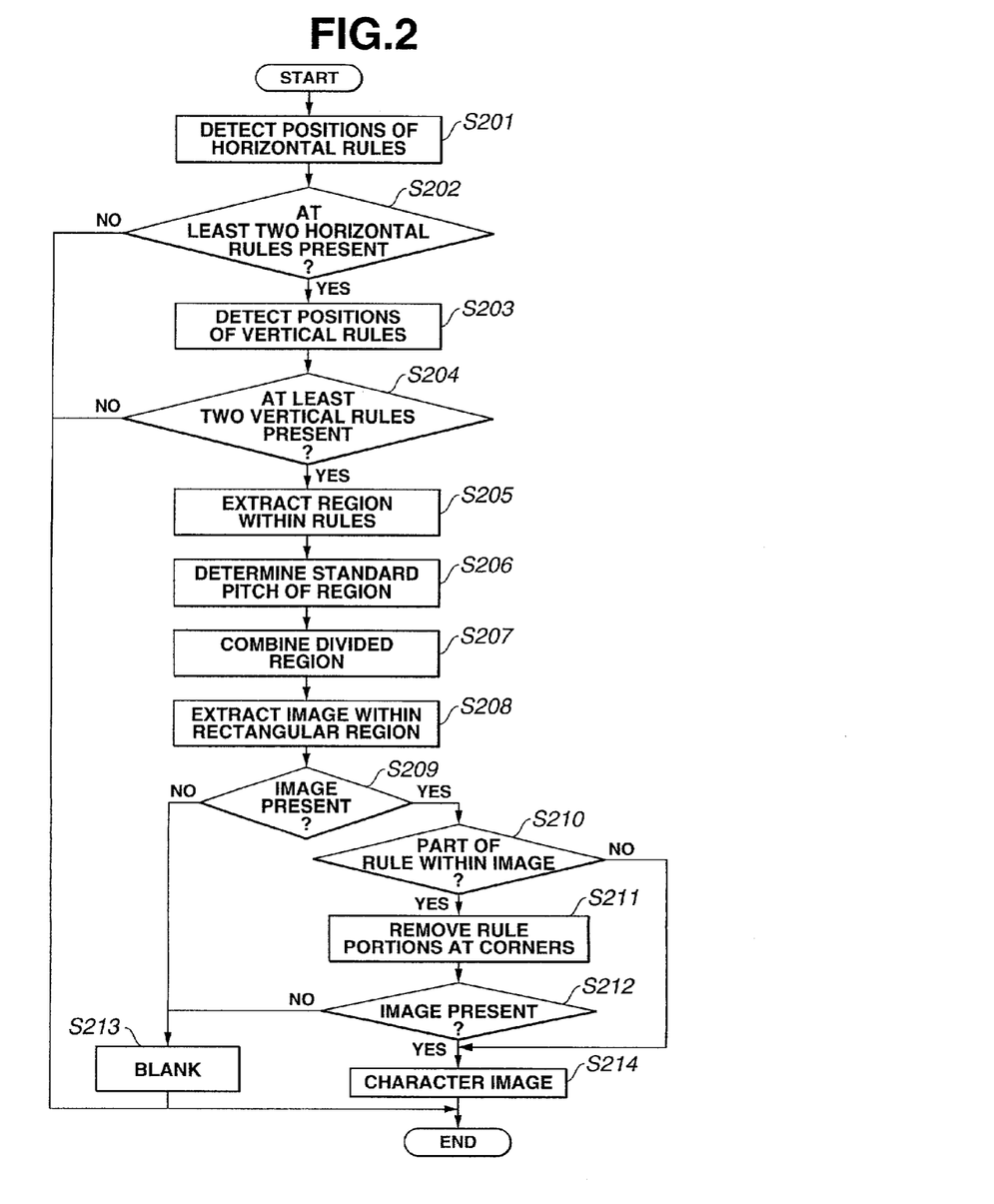
FIG. 2 is a flowchart illustrating a procedure for segmenting a character according to the first embodiment.

FIG. 2 is a flowchart illustrating a procedure for segmenting a described character from a frame region within a document image.

In step S201, the positions of rules in the horizontal direction (hereinafter abbreviated as "horizontal rules") are detected from an image read from a photoelectric transducer, such as the image scanner 108, and subjected to binary coding (hereinafter termed a "binary image"), or from a binary image that has been read and stored in the external storage device 104 or the like.

As for the position of a horizontal rule, in order to represent the coordinate values of the space of the horizontal rule in the vertical direction, and the thickness of the rule, the horizontal rule is represented by the coordinate values of the upper and lower ends of the horizontal rule in the vertical direction.

For example, when detecting the positions of a horizontal rule from a region for describing characters as shown in FIG. 4, in a simple detection procedure, a horizontal-direction histogram of black pixels with respect to a vertical projection plane is obtained, and the positions of rise and fall of the peak of a portion where the frequency of peaks equals at least a predetermined threshold are made the positions of the horizontal rule. In order to improve accuracy in detection, a region of processing may be determined while removing inclination, complementing a thin portion, and extracting a circumscribed rectangle of a frame for describing a character in advance. In this case, for example, the threshold may be set to ½ of the width of the line of the circumscribed rectangle. For detection of the positions of a horizontal rule, for example, a technique described in Japanese Patent Application Laid-Open (Kokai) No. 2000-380612 (2,000) filed by the assignee of the present application may be used.

In step S202, it is determined whether or not at least two horizontal rules have been extracted. If the result of the determination in step S202 is negative, the process is terminated assuming that a frame for describing a character is absent.

If the result of the determination in step S202 is affirmative, the process proceeds to step S203, where the positions of vertical rules present between two horizontal rules, i.e., between the coordinate of the lower portion of the upper horizontal rule and the coordinate of the upper portion of the lower horizontal rule, are detected.

For detecting the positions of a vertical rule, a vertical-direction histogram of black pixels with respect to a horizontal projection plane is obtained, and a portion where the frequency of peaks equals at least a threshold are identified as the position of the vertical rule. For example, the threshold may be set to at least 80% of the distance between the horizontal rules. For detection of the position of a vertical rule, for example, a technique described in Japanese Patent Application Laid-Open (Kokai) No. 2000-380612 (2,000) may also be used.

In step S204, it is determined whether or not at least two vertical rules have been extracted. If the result of the determination in step S204 is negative, the process is terminated assuming that a frame for describing a character is absent.

Figure 5:
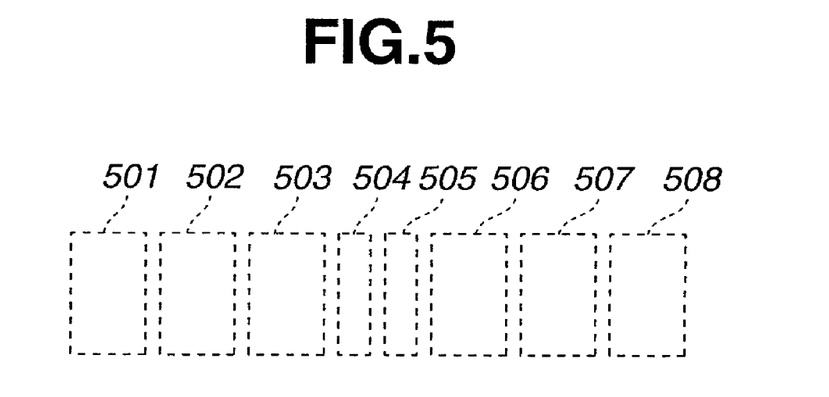
FIG. 5 is a diagram illustrating processing for extracting intra-rule rectangular regions, according to the first embodiment.

If the result of the determination in step S204 is affirmative, the process proceeds to step S205, where the inner portion of a rectangular region surrounded by the extracted horizontal rules and vertical rules is extracted as an intra-rule rectangular region. FIG. 5 illustrates a result of extracting intra-rule rectangular regions from the document shown in FIG. 4, using the above-described processing. At that time, since "1" is recognized as a vertical rule, two divided intra-rule rectangular regions 504 and 505 are present.

In step S206, a standard pitch of a frame for describing a character is obtained from the extracted intra-rule rectangular region. The standard pitch is determined, for example, from the distribution of the pitches of respective intra-rule rectangular regions. That is, based on the assumption that the pitch of each frame for describing a character within a range of processing is uniform, the distribution of the pitch of each intra-rule rectangular region is counted, and a pitch whose number is largest is adopted as the standard pitch.

When regions having a pitch smaller than the standard pitch are determined to constitute an erroneously divided region, then, in step S207, these regions are connected in order to have the standard pitch. As a result, the regions 504 and 505 shown in FIG. 5 are connected, and a region which coincides with the intra-rule rectangular region is obtained.

In step S208, black pixels within an intra-rule rectangular region are detected, and an image is extracted using a circumscribed rectangle surrounding the black pixels within the intra-rule rectangular region. An image is to be extracted using one circumscribed rectangle for one intra-rule rectangular region. In order to remove influence of isolated-point noise, noise contacting a rule, and the like, well-known noise removal may be performed. In another approach, when an extracted image is smaller than a predetermined size, the image may be assumed to be not present by determining that the image is noise.

In step S209, it is determined whether or not an image is present within the intra-rule rectangular region. If the result of the determination in step S209 is negative, the process proceeds to step S213, where the corresponding frame for describing a character is made a void.

If the result of the determination in step S209 is affirmative, the process proceeds to step S210, where it is determined whether or not a part of a rule is included within the extracted image. If the result of negative, the image is set as a character image in step S214. If the result of the determination in step S210 is affirmative, that portion is removed in step S211. After the removal, in step S212 it is determined whether an image remains and flow moves to step S213 or step S214 in accordance with the result of the determination.

Figure 6A:
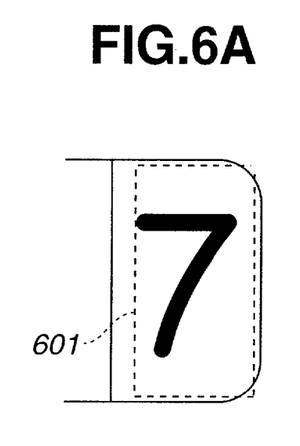
FIGS. 6A and 6B are diagrams illustrating an example in which a part of rules is included in the region of a circumscribed rectangle of black pixels, according to the first embodiment.
Figure 6B:
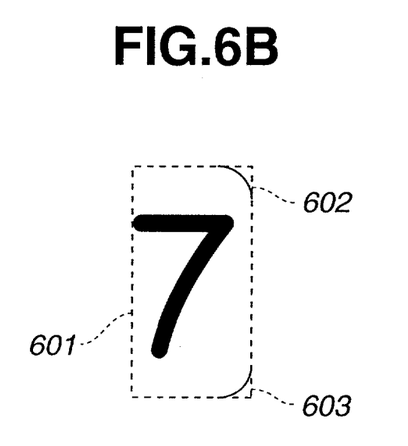

FIGS. 6A and 6B illustrate a case in which a part of one or more rules is contained within a region. The case of an intra-rule rectangular region 508 obtained in step S207 will now be described. First, a rectangular image within the intra-rule rectangular region 508 is segmented. A circumscribed rectangle of black pixels within the segmented rectangular region is represented by a broken-line portion 601 shown in FIG. 6A. As a result, as shown in FIG. 6B, portions 602 and 603 of rules remain in the image within the circumscribed rectangle 601. If character recognition is performed for the image shown in FIG. 6B, erroneous recognition will be performed. That is, when round corners are present, if it is intended to extract an image within the frame based on the intra-rule rectangular region, the round portions (each of which is a part of a rule) are included.

Figure 3:
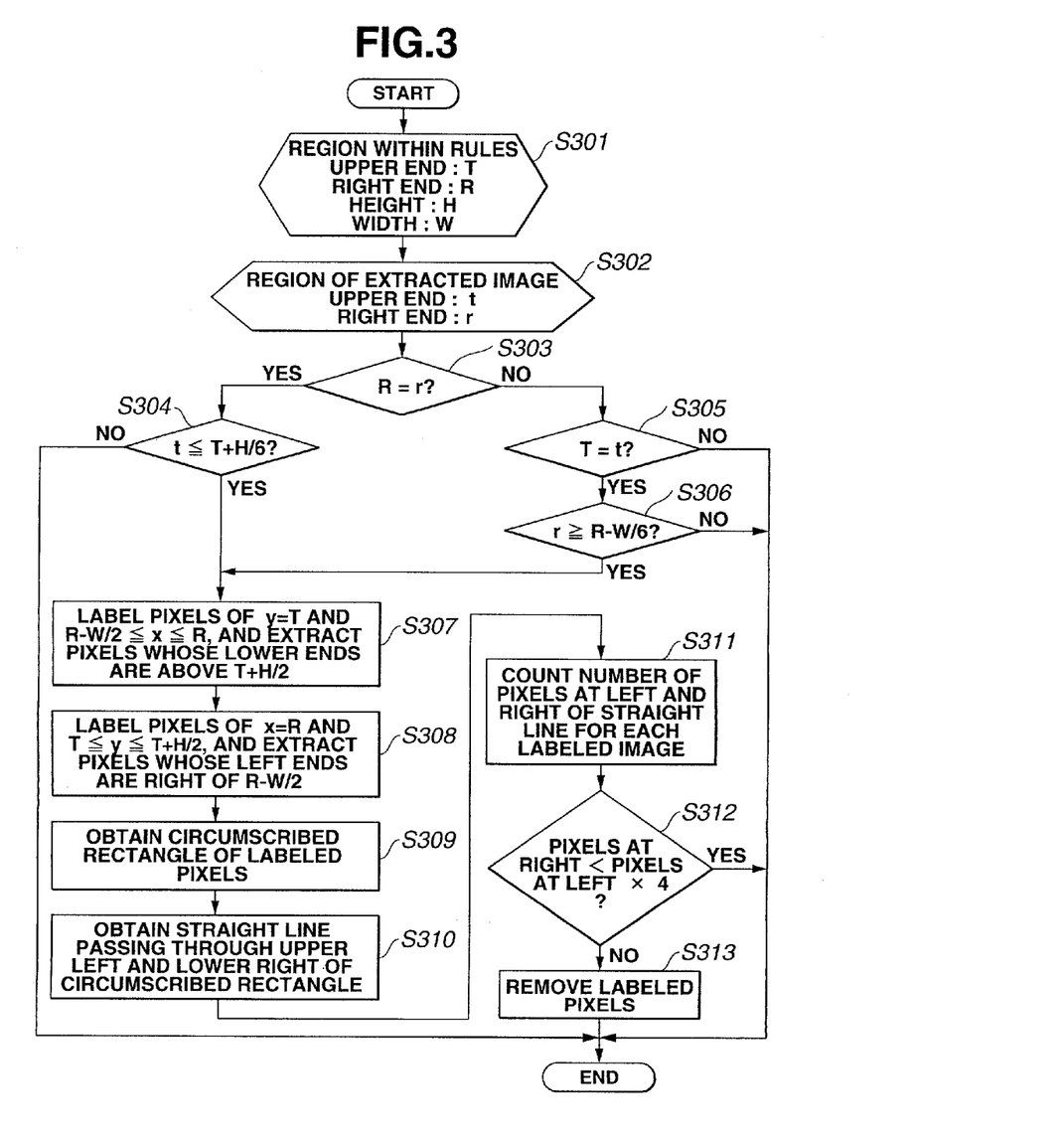
FIG. 3 is a flowchart illustrating a procedure for removing a corner rule portion, according to the first embodiment.

Removal when a part of a round rule is included within an extracted image (step S211) will now be described in detail illustrating a case in which an upper right corner is round, with reference to the flowchart shown in FIG. 3. A description will be provided assuming that the coordinates of the intra-rule rectangular region 508 obtained in step S207, and the coordinates of the circumscribed rectangle 601 of the black pixels obtained based on the intra-rule rectangular region 508 in step S208 are stored. It is assumed that the uppermost position at the left of the document image is made an origin of the coordinates, the x-coordinate value increases from the left to the right, and the y-coordinate value increases from top to bottom.

In step S301, for the intra-rule rectangular region 508, the y coordinate of the upper end is represented by T, the x coordinate of the right end is represented by R, the height of the region is represented by H, and the width of the region is represented by W. In step S302, the y coordinate of the upper end, and the x coordinate of the right end of the circumscribed rectangle 601 of the extracted black pixels are represented by t and r, respectively.

In step S303, it is determined whether or not the x coordinate R of the right end of the intra-rule rectangular region 508 equals the x coordinate r of the right end of the circumscribed rectangle 601 of the black pixels. If the result of the determination in step S303 is affirmative, the process proceeds to step S304, where it is determined whether or not the upper end of the circumscribed rectangle 601 of the black pixels is at a position higher than a position 1/6 of the height below the upper end of the intra-rule rectangular region 508. If the result of the determination in step S304 is affirmative, the process proceeds to step S307. If the result of the determination in step S304 is negative, the process is terminated. The above-described value of 1/6, and respective thresholds to be described below, are only examples for explaining the present invention. The present invention is not limited to these values.

If the result of the determination in step S303 is negative, the process proceeds to step S305, where it is determined whether or not the y coordinate T of the upper end of the intra-rule rectangular region 508 equals the y coordinate t of the upper end of the circumscribed rectangle 601 of the black pixels. If the result of the determination in step S305 is negative, the process is terminated. If the result of the determination in step S305 is affirmative, the process proceeds to step S306, where it is determined whether or not the right end of the circumscribed rectangle 601 of the black pixels is to the right of a position that is 1/6 of the width to the left of the right end of the intra-rule rectangular region 508. If the result of the determination in step S306 is affirmative, the process proceeds to step S307. If the result of the determination in step S306 is negative, the process is terminated.

In step S307, black pixels contacting the upper end of the intra-rule rectangular region 508 within a right-half portion thereof are subjected to labeling, and black pixels at the lowermost end of black pixels having the same label within an upper-half portion of the intra-rule rectangular region 508 (those at positions above 1/2 of the height) are extracted.

In step S308, black pixels contacting the right end of the intra-rule rectangular region 508 within an upper-half portion thereof are subjected to labeling, and black pixels at the left end of black pixels having the same label within a right-half portion of the intra-rule rectangular region 508 (those to the right of 1/2 of the width) are extracted.

Figure 7A:
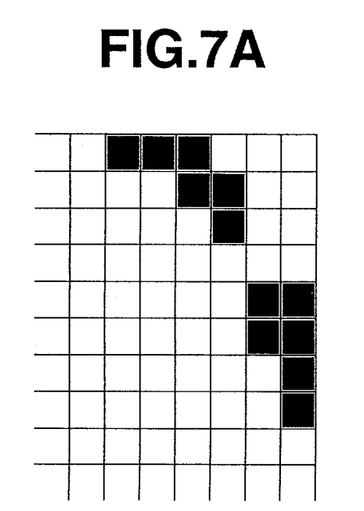
FIGS. 7A and 7B are diagrams illustrating a result of labeling an intra-rule region, according to the first embodiment.
Figure 7B:
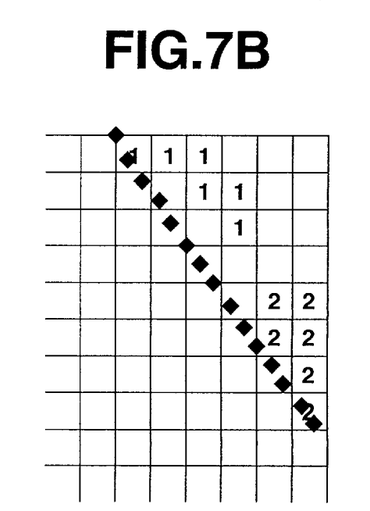

In step S309, a circumscribed rectangle of all labeled pixels is obtained. In the case shown in FIGS. 7A and 7B, FIG. 7A illustrates an original image, and FIG. 7B illustrates an image after labeling. According to labeling processing, two blocks having label 1 and label 2 are extracted. The obtained circumscribed rectangle is a rectangle including the two blocks.

In step S310, a straight line passing through the upper left corner and the lower right corner of the obtained circumscribed rectangle is obtained. In step S311, the numbers of labeled pixels to the right and to the left of the straight line are counted. If the pixels constitute a rule, most of the pixels are to be at the right of the straight line. Hence, it is possible to determine whether the pixels constitute a rule by comparing the numbers of labeled pixels to the right and to the left of the straight line.

In step S312, it is determined whether or not the number of pixels at the right is smaller than four times the number of pixels at the left. If the result of the determination in step S312 is affirmative, the process ends. If the result of the determination in step S312 is negative, the process proceeds to step S313, where labeled images are removed from the circumscribed rectangle 601. In the case shown in FIG. 7, since pixels are absent to the left of the straight line for both label 1 and label 2, the pixels having these two labels are removed.

For each of lower right, upper left and lower left corners, by performing the same processing by changing the direction and variables, it is possible to remove only rule portions even if an image is extracted inclusive of a part of rules.

Character recognition processing is performed for an image not including rules that has been obtained in the above-described manner. Since a rule portion is not included, a character described in a document can be correctly recognized.

As described above, according to the first embodiment, since black pixels contacting a border of an intra-rule region are subjected to labeling, and pixels are removed by applying determination criteria for each group of labeled pixels, a rule portion can be removed even if rules are disconnected at a round portion.

According to the first embodiment, since the determination criteria are obtained from the coordinates of labeled pixels, a character image can be extracted from a frame for describing a character so as not to include rules, even if the size of a round corner changes, or the roundness changes to an elliptical arc.

Since it is unnecessary to store the pattern of each corner, the capacity of a memory can be economized. Furthermore, it is unnecessary to perform matching processing with a plurality of corner patterns, and therefore the processing time can be reduced.

(Second Embodiment)

Figure 8:
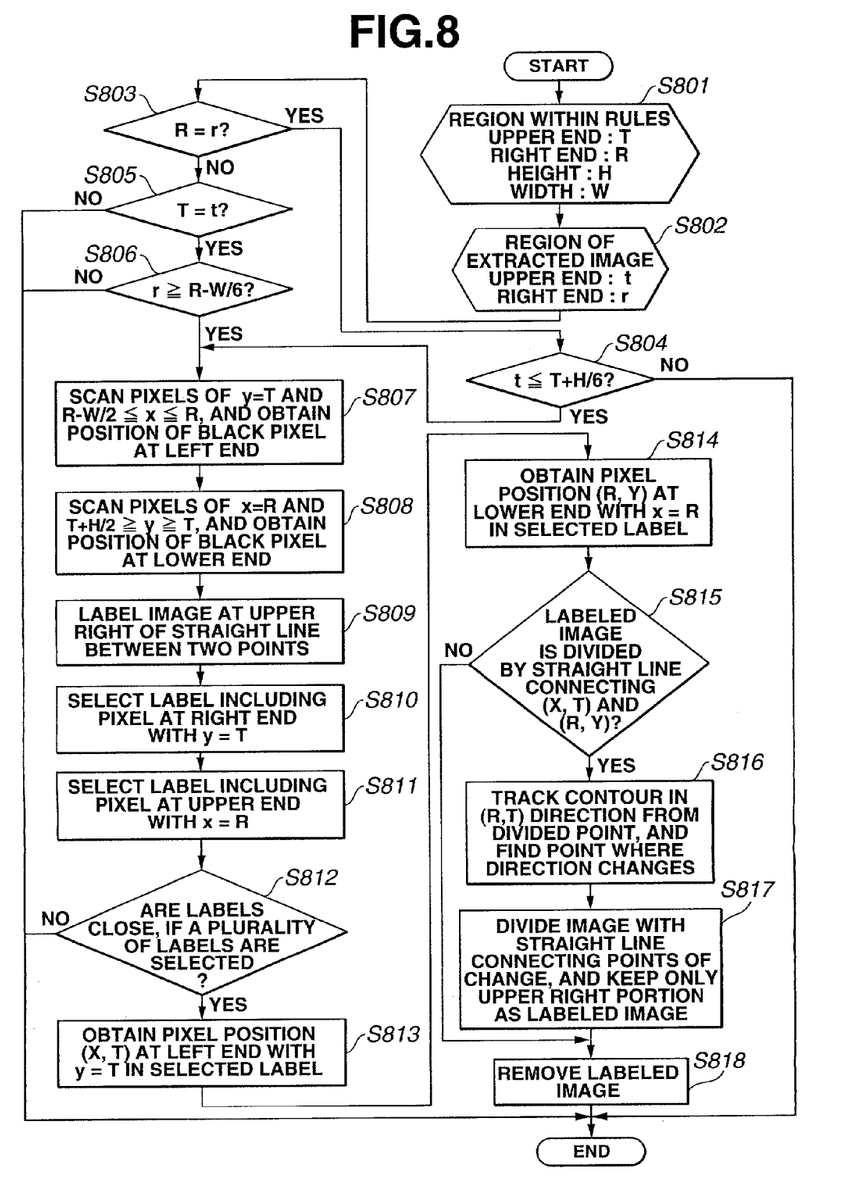
FIG. 8 is a flowchart illustrating a procedure for removing a corner rule portion, according to a second embodiment of the present invention.
Figure 9:
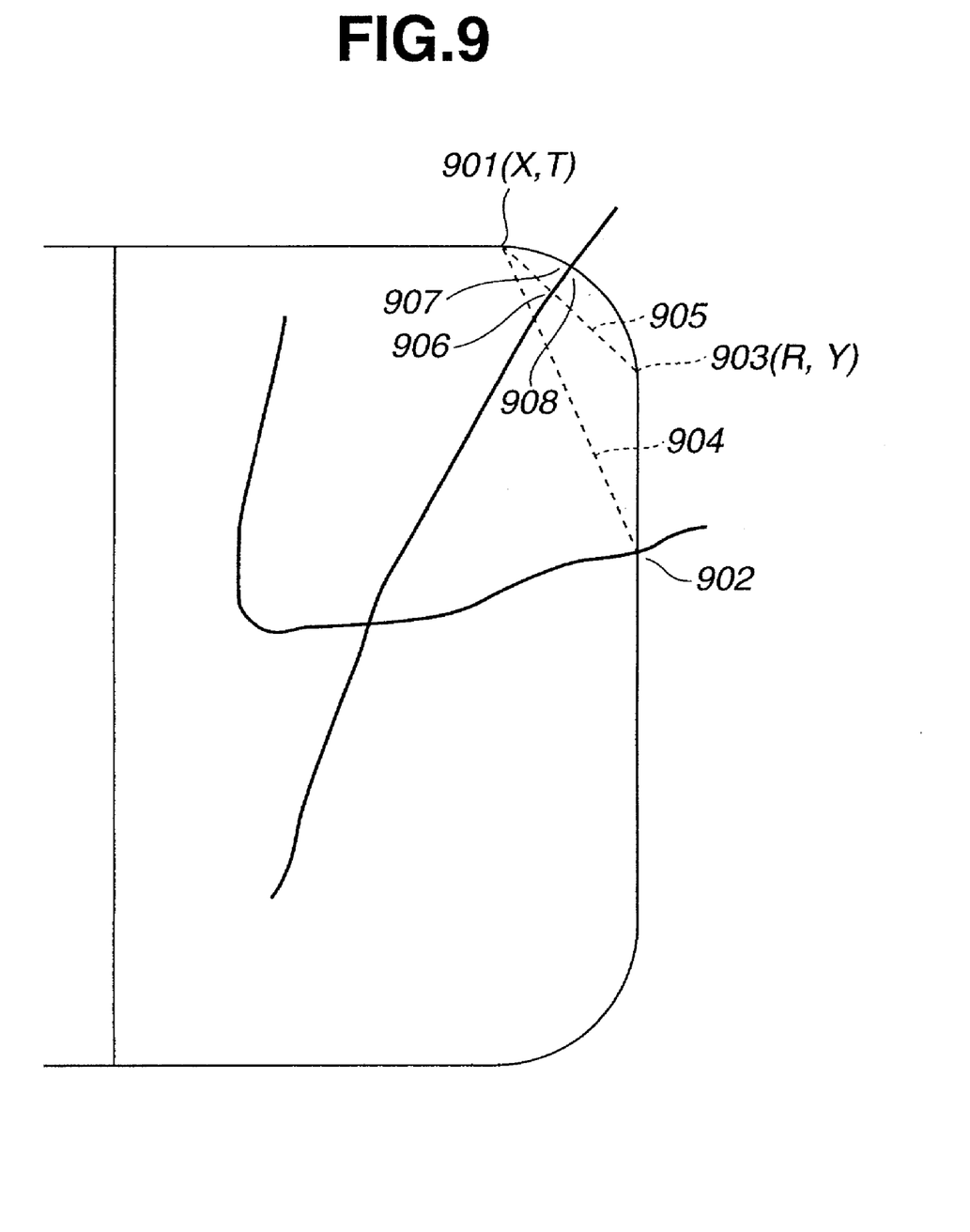
FIG. 9 is a diagram illustrating a frame for describing a character and a described character in the second embodiment.

A description will now be provided of a case in which a corner rule portion is removed in step S211 when a part of a character is superposed on a corner, according to a second embodiment of the present invention executed by the document reading apparatus shown in FIG. 1, with reference to the flowchart shown in FIG. 8, and the drawing in FIG. 9.

FIG. 9 illustrates a frame for describing a character that is to be processed in the second embodiment. The upper right corner is rounded, and a part of a character is described there in a state of exceeding the frame boundary.

A processing procedure when the upper right corner is round will now be described.

Referring to FIG. 8, in step S801, for an intra-rule rectangular region obtained in the same manner as in the first embodiment, the y coordinate of the upper end is represented by T, the x coordinate of the right end is represented by R, the height of the region is represented by H, and the width of the region is represented by W. In step S802, the y coordinate of the upper end and the x coordinate of the right end of a circumscribed rectangle of extracted black pixels are represented by t and r, respectively.

In step S803, it is determined whether or not the x coordinate R of the right end of the intra-rule rectangular region equals the x coordinate r of the right end of the circumscribed rectangle of the black pixels. If the result of the determination in step S803 is affirmative, the process proceeds to step S804, where it is determined whether or not the upper end of the circumscribed rectangle of the black pixels is at a position higher than a position 1/6 of the height below the upper end of the intra-rule rectangular region. If the result of the determination in step S804 is affirmative, the process proceeds to step S807. If the result of the determination in step S804 is negative, the process is terminated. The above-described value of 1/6, and respective thresholds to be described below, are only examples for explaining the present invention. The present invention is not limited to these values.

If the result of the determination in step S803 is negative, the process proceeds to step S805, where it is determined whether or not the y coordinate T of the upper end of the intra-rule rectangular region equals the y coordinate t of the upper end of the circumscribed rectangle of the black pixels. If the result of the determination in step S805 is negative, the process is terminated. If the result of the determination in step S805 is affirmative, the process proceeds to step S806, where it is determined whether or not the right end of the circumscribed rectangle of the black pixels is to the right of a position that is ⅙ of the width to the left of the right end of the intra-rule rectangular region. If the result of the determination in step S806 is affirmative, the process proceeds to step S807. If the result of the determination in step S806 is negative, the process is terminated.

In step S807, the upper end of the intra-rule rectangular region within a right-half portion is scanned, and the position of a black pixel at the left end position is obtained (901). In step S808, the right end of the intra-rule rectangular region within an upper-half portion is scanned, and the position of a black pixel at the lowermost position is obtained (902).

In step S809, only pixels at upper right portions of a straight line (indicated by broken line 904) connecting the obtained two positions are subjected to labeling.

In step S810, a label including a pixel at the right end that contacts the upper end of the intra-rule rectangular region from among labeled pixels is selected.

In step S811, a label including a pixel at the upper end that contacts the right end of the intra-rule rectangular region from among labeled pixels is selected. If a thin portion and the like are absent in rules, the label selected in step S810 is usually the same as the label selected in step S811.

When a plurality of labels have been selected in steps S810 and S811, then, in step S812, it is determined whether or not the labels are close. If the result of the determination in step S812 is negative, the concerned image is determined to be not the image of a rule at a corner portion, and the process is terminated. Whether or not the labels are close is determined by checking whether or not circumscribed rectangles of labeled black-pixel images are superposed, or whether or not the distance between respective circumscribed rectangles is within a predetermined number of pixels (for example, one pixel).

In step S813, the position of a pixel at the left end that contacts the upper end of the inter-rule region from the selected label is obtained (901).

In step S814, the position of a pixel at the lower end that contacts the right end of the inter-rule region from the selected labels is obtained (903).

If a described character or the like does not contact a rule at a position other than a round corner, the position of the pixel obtained in step S813 is the same as the position of the pixel obtained in step S807, and the position of the pixel obtained in step S814 is the same as the position of the pixel obtained in step S808. At this stage, the starting position of a round corner included in the extracted image is obtained.

When the position obtained in step S813 is represented by (X,T), and the position obtained in step S814 is represented by (R,Y), then in step S815, it is determined whether or not the selected labeled image is divided by a straight line (indicated by broken lines 905) connecting the positions (X,T) and (R,Y). If a character crossing a rule is absent, the image is not divided. If the result of the determination in step S815 is affirmative, the process proceeds to step S816, where the contour of labeled pixels is tracked from the point of division 906 in a direction (R,T), and points 907 and 908 where the direction of the contour greatly changes are searched. If the width of a line crossing a rule corresponds to at least two pixels, two pixels are present on the contour, and the two pixels are tracked. If the width corresponds to one pixel, the contour of the upper portion and the contour of the lower portion of the pixel on the contour are tracked.

As a result, the two points 907 and 908 where the direction of the contour changes are obtained. In step S817, the labeled image is divided by a straight line connecting the two points, and an image present at the upper right side is left as a labeled image.

The left labeled image is determined to be a part of a rule, and is removed in step S818. Thus, it is possible to obtain an image in which a round corner of rules is removed, and perform character recognition processing for the obtained image.

As in the first embodiment, for each of lower right, upper left and lower left corners, by performing the same processing, rule portions are removed. As a result, it is possible to extract a character image in which rule portions are removed.

As described above, according to the second embodiment, since labeling is performed by limiting the region of an image to be processed, and the position of a round corner of a rule is specified, it is possible to remove only rule portions and leave a character within a frame, even when a part of the character is threaded through the round portion.

(Other Embodiments)

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may, of course, also be achieved by supplying a system or an apparatus with a storage medium (or a recording medium) storing program codes of software for realizing the functions of the above-described embodiments, and reading and executing the program codes stored in the storage medium by means of a computer (or a CPU or an MPU (microprocessor unit)) of the system or the apparatus. In such a case the program codes themselves read from the storage medium realize the functions of the above-described embodiments, so that the storage medium storing the program codes constitutes the present invention. The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiments are realized by the processing.

Furthermore, program codes constituting the present invention may be read from an external apparatus connected via a network whenever necessary and may be executed by a CPU.

Figure 10:
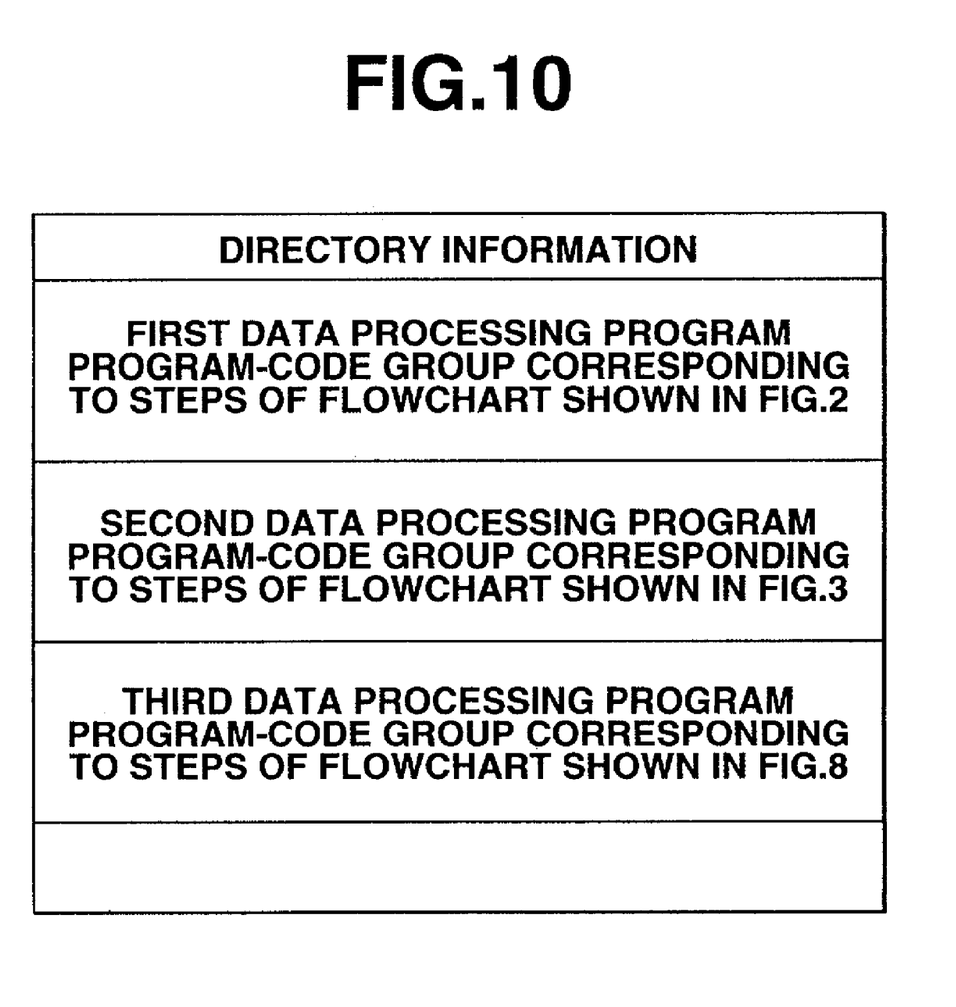
FIG. 10 is a diagram illustrating a memory map of a storage medium storing various processing programs which can be read by a document reading apparatus according to the present invention.

When applying the present invention to the above-described storage medium, program codes corresponding to the above-described flowcharts are stored in the storage medium. FIG. 10 illustrates an example of such a storage medium. In FIG. 10, a memory map of a storage medium storing various data processing programs capable of being read by a document reading apparatus according to the present invention is shown. Although not illustrated, sets of data to be used for various programs are also managed in a directory of the storage medium. In some cases, for example, a program for installing various programs is stored.

As described above, according to the present invention, even in a frame for describing a character including rules having round corners, a part of rules is not extracted as a character, and a character within the frame can be correctly extracted. Since a described character can be correctly extracted, the rate of character recognition is improved.

According to the present invention, it is automatically determined whether or not a part of rules is included, and if the result of the determination is affirmative, that part is removed. Accordingly, it is unnecessary to assign the shape of each frame in advance.

The individual components shown in outline or designated by blocks in the drawings are all well known in the image processing apparatus, method and program arts and their specific construction or operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   row-direction-rule extraction means for extracting rules in a row direction from a document image;
   column-direction-rule extraction means for extracting rules in a column direction from the document image;
   image-region extraction means for extracting an image region based on a region surrounded by the row-direction rules extracted by said row-direction-rule extraction means and the column-direction rules extracted by said column-direction-rule extraction means; and
   removal means for removing pixels constituting a part of rules from the image region extracted by said image-region extraction means, by identifying whether or not a desired pixel group contacting at least one of the row-direction rules and the column-direction rules constitutes part of the rules, by performing labeling for the pixel group.

2. An image processing apparatus according to claim 1, wherein said removal means removes the pixels constituting part of the rules from the image region by setting a border based on the labeled pixel group, measuring respective numbers of pixels on opposite sides of the border in the labeled pixel group, and identifying whether or not the labeled pixel group constitutes part of the rules based on a result of the measurement.

3. An image processing apparatus according to claim 1, wherein said removal means removes the pixels constituting part of the rules from the image region by setting a border based on the labeled pixel group, identifying a position where the border and the labeled pixel group intersect, tracking a contour line from the position of intersection, and identifying pixels constituting part of the rules from the labeled pixel group based on a result of tracking the contour line.

4. An image processing apparatus according to claim 1, wherein the labeling is performed only for pixels within a predetermined region of the image region.

5. An image processing apparatus according to claim 1, further comprising character recognition means for performing character recognition of an image within the image region from which the pixels constituting part of the rules have been removed by said removal means.

6. An image processing method comprising:
   a row-direction-rule extraction step of extracting rules in a row direction from a document image;
   a column-direction-rule extraction step of extracting rules in a column direction from the document image;
   an image-region extraction step of extracting an image region based on a region surrounded by the row-direction rules extracted in said row-direction-rule extraction step and the column-direction rules extracted in said column-direction-rule extraction step; and
   a removal step of removing pixels constituting a part of rules from the image region extracted in said image-region extraction step, by identifying whether or not a desired pixel group contacting at least one of the row-direction rules and the column-direction rules constitutes part of the rules, by performing labeling for the pixel group.

7. An image processing method according to claim 6, wherein in said removal step, the pixels constituting part of the rules are removed from the image region by setting a border based on the labeled pixel group, measuring respective numbers of pixels on opposite sides of the border in the labeled pixel group, and identifying whether or not the labeled pixel group constitutes part of the rules based on a result of the measurement.

8. An image processing method according to claim 6, wherein in said removal step, the pixels constituting part of the rules are removed from the image region by setting a border based on the labeled pixel group, identifying a position where the border and the labeled pixel group intersect, tracking a contour line from the position of intersection, and identifying pixels constituting part of the rules from the labeled pixel group based on a result of tracking the contour line.

9. An image processing method according to claim 6, wherein the labeling is performed only for pixels within a predetermined region of the image region.

10. An image processing method according to claim 6, further comprising a character recognition step of performing character recognition of an image within the image region from which the pixels constituting the part of the rules have been removed in said removal step.

11. A computer-readable storage medium storing an image processing program, capable of being executed by a computer, including program codes for causing a computer to realize steps, said steps comprising:

a row-direction-rule extraction step of extracting rules in a row direction from a document image;

a column-direction-rule extraction step of extracting rules in a column direction from the document image;

an image-region extraction step of extracting an image region based on a region surrounded by the row-direction rules extracted in said row-direction-rule extraction step and the column-direction rules extracted in said column-direction-rule extraction step; and a removal step of removing pixels constituting a part of rules from the image region extracted in said image-region extraction step, by identifying whether or not a desired pixel group contacting at least one of the row-direction rules and the column-direction rules constitutes part of the rules, by performing labeling for the pixel group.

12. A computer-readable storage medium according to claim 11, wherein in said removal step, the pixels constituting part of the rules are removed from the image region by setting a border based on the labeled pixel group, measuring respective numbers of pixels on opposite sides of the border in the labeled pixel group, and identifying whether or not the labeled pixel group constitutes part of the rules based on a result of the measurement.

13. A computer-readable storage medium according to claim 11, wherein in said removal step, the pixels constituting part of the rules are removed from the image region by setting a border based on the labeled pixel group, identifying a position where the border and the labeled image group intersect, tracking a contour line from the position of intersection, and identifying pixels constituting part of the rules from the labeled pixel group based on a result of tracking the contour line.

14. A computer-readable storage medium according to claim 11, wherein the labeling is performed only for pixels within a predetermined region of the image region.

15. A computer-readable storage medium according to claim 11, further comprising a character recognition step of performing character recognition of an image within the image region from which the pixels constituting part of the rules have been removed in said removal step.

16. An image processing apparatus comprising:

an image scanner; and a processor, said processor being configured to (i) extract rules in a row direction from a document image scanned by said image scanner, (ii) extract rules in a column direction from the document image, (iii) extract an image region based on a region surrounded by the extracted row-direction rules and the extracted column-direction rules, and (iv) remove pixels from the extracted image region that constitute part of rules, by identifying whether a desired pixel group contacting at least one of the row-direction rules and column-direction rules constitutes part of the rules, by performing labeling for the pixel group.

17. An image processing apparatus according to claim 16, wherein said processor is configured to remove the pixels constituting part of the rules by setting a border based on the labeled pixel group, measuring respective numbers of pixels on opposite sides of the border in the labeled pixel group, and identifying whether the labeled pixel group constitutes part of the rules based on a result of the measurement.

18. An image processing apparatus according to claim 16, wherein said processor is configured to remove the pixels constituting part of the rules by setting a border based on the labeled pixel group, identifying a position where the border and the labeled pixel group intersect, tracking a contour line from the position of intersection, and identifying pixels constituting part of the rules from the labeled pixel group based on a result of tracking the contour line.

19. An image processing apparatus according to claim 16, wherein the processor is configured to perform labeling only for pixels within a predetermined region of the image region.

20. An apparatus according to claim 16, wherein said processor is further configured to perform character recognition of an image within the image region from which the pixels constituting part of the rules have been removed.

* * * * *

UNITED STATES PATENT AND TRADEMARK OFFICE
CERTIFICATE OF CORRECTION

PATENT NO. : 7,103,220 B2
APPLICATION NO. : 10/153769
DATED : September 5, 2006
INVENTOR(S) : Hiroaki Ikeda It is certified that error appears in the above-identified patent and that said Letters Patent is hereby corrected as shown below:

Col. 1, line 63, "a" should read --an--.

Col. 2, line 5, "(2,000)" should read --(2000)--.

Col. 5, line 20, "(2,000)" should read --(2000)--.
        line 41, "(2,000)" should read --(2000)--.

Col. 6, line 24, "of negative" should read --is negative--.

Signed and Sealed this

Twenty-sixth Day of June, 2007

JON W. DUDAS
*Director of the United States Patent and Trademark Office*